Aug. 31, 1954  J. B. GUDALIS  2,687,760
ANTISKID DEVICE
Filed Nov. 23, 1951  2 Sheets-Sheet 1

James B. Gudalis
INVENTOR.

BY
Attorneys

Aug. 31, 1954     J. B. GUDALIS     2,687,760
ANTISKID DEVICE
Filed Nov. 23, 1951     2 Sheets-Sheet 2
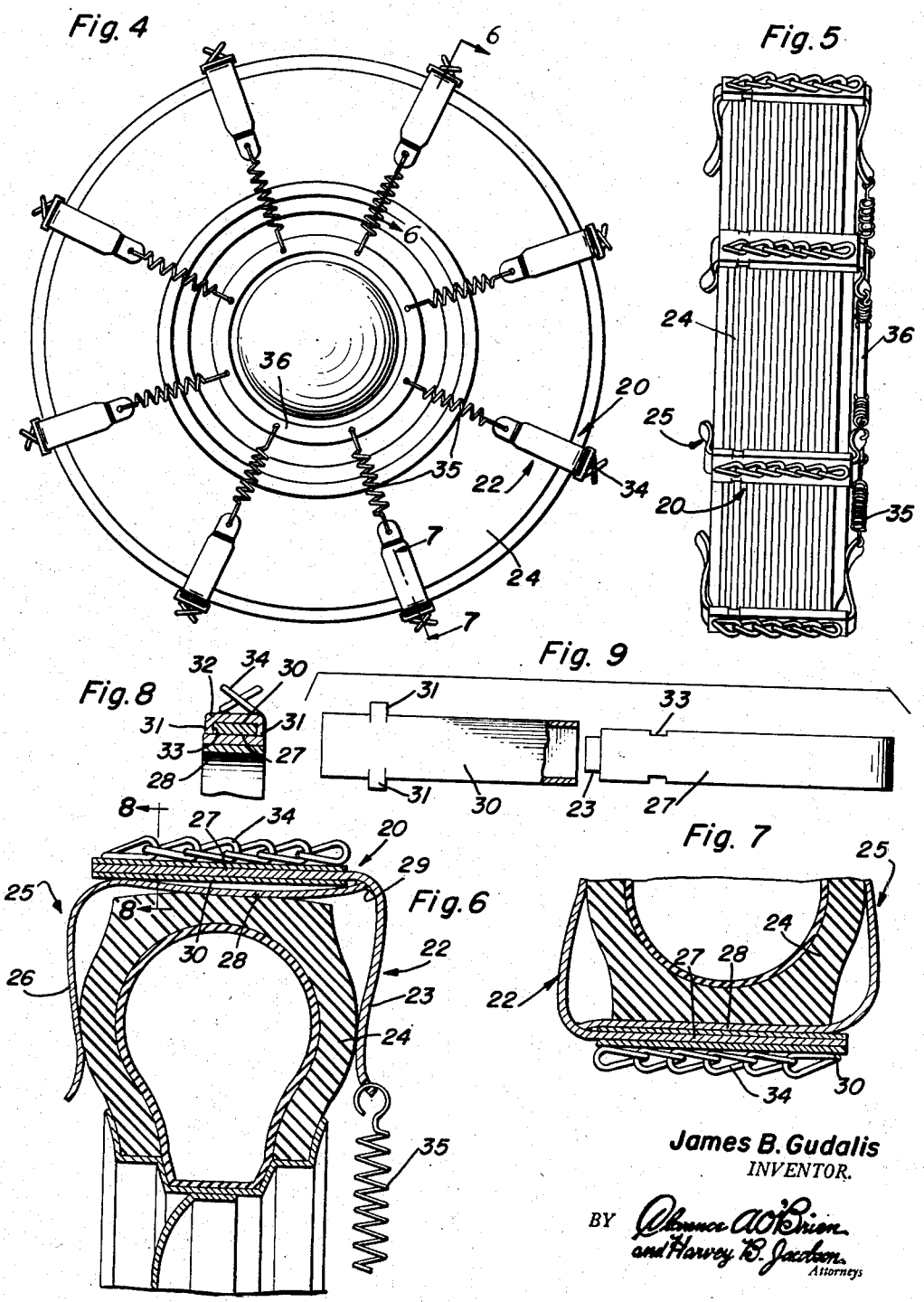
James B. Gudalis
INVENTOR.

Patented Aug. 31, 1954

2,687,760

UNITED STATES PATENT OFFICE 2,687,760

ANTISKID DEVICE

James B. Gudalis, Pittsburgh, Pa.

Application November 23, 1951, Serial No. 257,797

3 Claims. (Cl. 152—218)

The present invention relates to new and useful improvements in anti-skid devices for vehicle wheels and more particularly to the provision of a plurality of cross units for the tread of a tire with means for individually attaching the same in position thereon. An important object of the invention is to provide circumferential connecting means for a group of the cross units whereby the cross units may be applied to a tire without necessitating jacking of the wheel and further to provide a tightening means for the circumferential connecting members to hold the cross units tightly on the tire.

A further object is to provide a device of this character of simple and practical construction, which is efficient and dependable in use, relatively inexpensive to manufacture and otherwise well adapted for the purposes for which it is intended.

Other objects and advantages reside in the details of construction and operation as more fully hereinafter described and claimed, reference being had to the accompanying drawings forming part hereof, wherein like numerals refer to like parts throughout, and in which:

Figure 4 is a side elevational view of a modified construction;

Figure 5 is a view in elevation of the tire tread showing the cross units of Figure 4;

Figure 6 is an enlarged transverse sectional view taken on a line 6—6 of Figure 4;

Figure 7 is a similar view taken on a line 7—7 of Figure 4;

Figure 8 is an enlarged transverse sectional view taken on a line 8—8 of Figure 6;

Figure 9 is a group top plan view of the modified cross unit with the chain removed.

Figure 1:
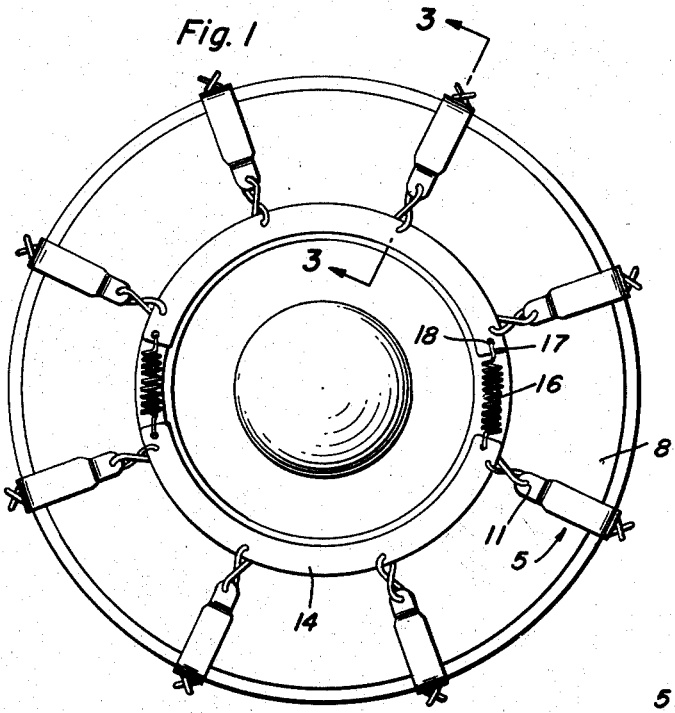
Figure 1 is a side elevational view.
Figure 2:
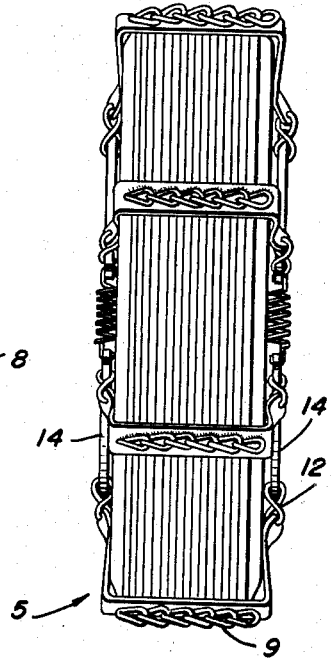
Figure 2 is a view in elevation of the tread of a tire showing the cross units in position thereon.
Figure 3:
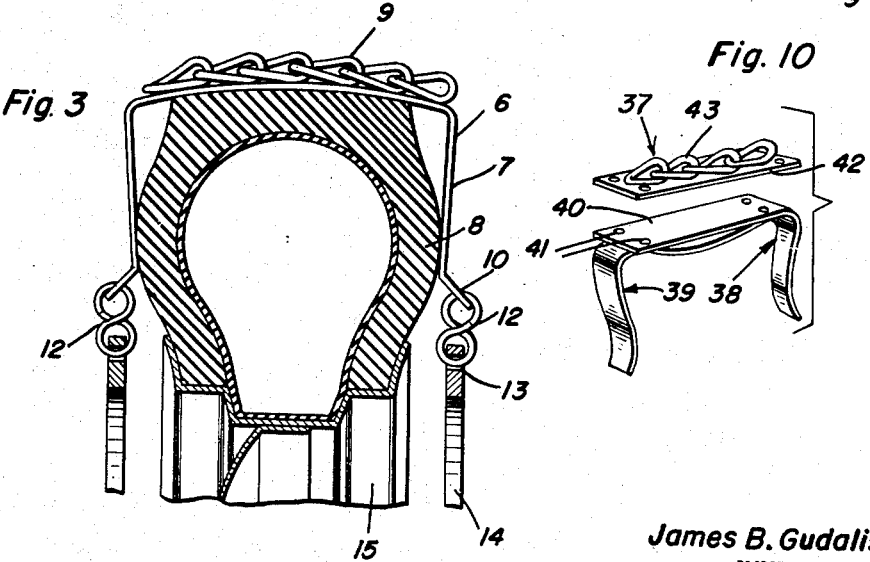
Figure 3 is an enlarged fragmentary transverse sectional view taken on the line 3—3 of Figure 1.

Referring now to the drawing in detail and first with respect to the form of the invention illustrated in Figures 1 to 3 inclusive, the numeral 5 designates one of the cross units generally and which comprises a substantially U-shaped resilient strap metal clip 6 having its legs 7 normally inclined inwardly to tightly grip the side walls of a tire casing 8 to hold the cross unit transversely of the tread of the tire.

A section of tire chain links 9 is spot welded to the outer surface of the clip 6 to provide a traction means.

The free ends of the leg portions 7 of the clip 6 are inclined outwardly at the sides of the tire casing to form tongues 10 having openings 11 therein to receive one end of split rings 12 or other suitable wire fasteners, snap hooks or the like (not shown) for quickly attaching in openings 13 of arcuate or semi-cyclindrical ring members 14.

A group of the cross units 5 are attached at their ends to a pair of the arcuate or semi-cylindrical ring members 14 which are positioned respectively at the inner side and outer side of a vehicle wheel 15, as indicated in Figure 3 of the drawings, and the arcuate or semi-circular ring members 14 for each group of cross units 5 are connected to each other at each side of the tire by coil springs 16 provided with hooks 17 at the ends of the springs for engaging in openings 18 in the ends of the arcuate members 14.

In applying the anti-skid device to a vehicle tire 8 a group of the cross units 5 attached at their ends to the arcuate or semi-circular ring members 14 are placed over the tread of the tire at the top of the wheel and the wheel is then partially rotated until the cross units occupy the lowermost portion of the tire. The resilient legs 7 of the clips 6 forming the cross units will grip the sides of the tire casing 8 to hold the cross units in position thereon during this partial turning of the wheel.

The second group of cross units 5, having their ends also attached to arcuate or semi-circular ring members 14, are then placed on the uppermost portion of the tire and the ends of the arcuate or semi-circular ring members 14 at both the inside and outside of the tire connected to each other by the coil springs 16.

Any one of the cross units 5 may be removed and replaced by disengaging the fasteners 12 therefrom and without disturbing the remaining cross units.

In Figures 4 to 9 inclusive I have illustrated a modified cross unit construction shown generally at 20 and which comprises a clip composed of a rigid L-shaped metal strap member 22 having a vertical portion 23 positioned in tight gripping engagement with the outer side of a tire casing 24 and a resilient L-shaped metal strap member 25 having a vertical portion 26 positioned against the inner side of the casing.

The horizontal portions 27 and 28 of the L-shaped members are positioned transversely of the tread of the tire and with the horizontal portion 27 of rigid member 22, and with the extremity of the former welded to the latter at the junction of the vertical and horizontal portions of said rigid member, as shown at 29.

The horizontal portion 28 of resilient member 25 is bowed or curved toward the tread of the tire, while the horizontal portion 27 of rigid member 22 is straight and is inserted in one end of a metal casing or sleeve 30 of rectangular shape in cross section. Bendable tongues 31 are welded or otherwise suitably secured to the opposite sides of casing 30 and are pressed inwardly through openings 32 in the sides of the casing to enter notches 33 in the side edges of the horizontal portion 27 of rigid member 22 to lock the casing thereon.

A section of chain links 34 is welded longitudinally on the outer surface of the casing 30.

Coil springs 35 connect the radially inwardly projecting ends of vertical portions 23 of rigid members 22 to a ring 36 positioned concentrically at the outer side of the tire casing to hold the cross units 20 transversely of the tire.

The bowed or curved transverse horizontal portions 28 of resilient member 25 normally holds casing 30 and rigid transverse portion 27 away from the tread of the tire, when the clip 20 is positioned at the top or at the sides of the tread, as shown in Figure 6, but the weight of the tire and wheel flatten the resilient bowed or curved transverse portion 28 when the clip occupies a lowermost position on the tire, as shown in Figure 7, to spring the vertical portion 26 of resilient member 25 inwardly against the tire to increase the gripping action of the clip. Accordingly each time the cross unit engages the road surface it is tightened on the tire to prevent slipping on the tire due to traction.

Figure 10:
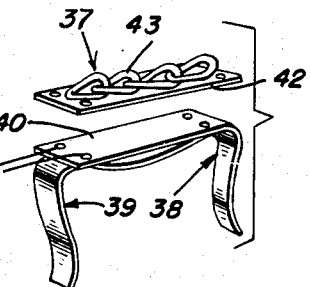
Figure 10 is a group perspective view of a further cross unit modification.

In Figure 10 the cross unit is shown generally at 37 and includes the rigid L-shaped member 38 and resilient L-shaped member 39 arranged and welded to each other as described for Figures 4 to 9 inclusive. Horizontal transverse portion 40 of rigid member 38 is formed with rivet openings 41 by means of which a plate 42 is riveted thereto and on top of which the chain section 43 is welded.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described my invention, what is claimed as new is:

1. An anti-skid device for tires comprising a plurality of U-shaped resilient clips, each clip composed of a rigid L-shaped member and a resilient L-shaped member, each including horizontal portions positioned in overlapping relation to each other transversely of the tread of a tire, and said horizontal portion of the resilient member being fixed at its extremity to the rigid member, said L-shaped members also including vertical portions positioned radially at opposite sides of the tire, traction means carried at the outer surface of the clip and fixed to the rigid member, and means positioned concentrically of the tire at least at one side thereof and connecting a group of the clips thereto, said horizontal portion of the resilient L-shaped member being curved longitudinally to subject the clip to an outward spring biasing action with respect to the tread of the tire and said vertical portion of the resilient member being flexed inwardly to increase the gripping action of the clip with the tire by weight of the tire subjected to the clip.

2. An anti-skid device for tires comprising a U-shaped resilient clip composed of a rigid L-shaped member and a resilient L-shaped member, each including horizontal portions positioned in overlapping relation to each other transversely of the tread of a tire, said horizontal portion of the resilient member being fixed at its extremity to the horizontal portion of the rigid member at a point inwardly of the extremity of the latter, a flat sleeve enclosing the horizontal portion of the rigid member, and traction means on the outer surface of the sleeve, said resilient horizontal portion being longitudinally concave, said rigid horizontal portion being flat and pressing against said longitudinally concave resilient portion and urging the vertical portion of the resilient member against the side of the tire.

3. An anti-skid device for tires comprising a U-shaped resilient clip composed of a rigid L-shaped member and a resilient L-shaped member, each including horizontal portions positioned in overlapping relation to each other transversely of the tread of a tire, said horizontal portion of the resilient member being fixed at its extremity to the horizontal portion of the rigid member at a point inwardly of the extremity of the latter, a flat sleeve enclosing the horizontal portion of the rigid member, means locking the sleeve to said rigid member, and traction means on the outer surface of the sleeve, said resilient horizontal portion being longitudinally concave, said rigid horizontal portion being flat and pressing against said longitudinally concave resilient portion and urging the vertical portion of the resilient member against the side of the tire.

References Cited in the file of this patent

UNITED STATES PATENTS

| Number | Name | Date |
| --- | --- | --- |
| 1,349,514 | Lauer | Aug. 10, 1920 |
| 2,176,631 | Kunkle | Oct. 17, 1939 |
| 2,343,131 | Austin | Feb. 29, 1944 |
| 2,434,017 | Snedeker | Jan. 6, 1948 |
| 2,437,040 | Prevost | Mar. 2, 1948 |
| 2,510,451 | Williams | June 6, 1950 |
| 2,559,425 | Haracz | July 3, 1951 |
| 2,574,327 | Grady | Nov. 6, 1951 |